(12) United States Patent
Gonzalez et al.

(10) Patent No.: US 10,031,785 B2
(45) Date of Patent: Jul. 24, 2018

(54) PREDICTIVE COMPUTING RESOURCE ALLOCATION FOR DISTRIBUTED ENVIRONMENTS

(71) Applicant: International Business Machines Corporation, Armonk, NY (US)

(72) Inventors: Emmanuel B. Gonzalez, Guadalajara (MX); Shaun E. Harrington, Sahuarita, AZ (US); Harry McGregor, Tucson, AZ (US); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 14/683,795

(22) Filed: Apr. 10, 2015

(65) Prior Publication Data

US 2016/0301624 A1    Oct. 13, 2016

(51) Int. Cl.
*G06F 9/50* (2006.01)
*H04L 12/911* (2013.01)

(52) U.S. Cl.
CPC .... *G06F 9/5083* (2013.01); *G06F 2209/5019* (2013.01); *H04L 47/783* (2013.01); *H04L 47/823* (2013.01)

(58) Field of Classification Search
CPC .................................................. G06F 9/5011
See application file for complete search history.

(56) References Cited

U.S. PATENT DOCUMENTS

| | | | |
|---|---|---|---|
| 5,659,743 A * | 8/1997 | Adams | G06F 3/0601 |
| 8,255,915 B1 | 8/2012 | Blanding et al. | |
| 8,762,299 B1 | 1/2014 | Brekenridge et al. | |
| 8,775,741 B1 * | 7/2014 | de la Iglesia | G06F 12/0862 711/137 |
| 8,838,895 B2 * | 9/2014 | Yi | G06F 12/0868 711/103 |
| 8,839,254 B2 | 9/2014 | Horvitz et al. | |
| 8,914,469 B2 * | 12/2014 | Dawson | G06Q 10/10 705/80 |

(Continued)

OTHER PUBLICATIONS

Alur, Nagraj, et al., "LinkIntegrity+: A Web Asset Integrity Solution," Proceeding of the 2nd International Conference on Internet Computing (IC 2001), Jun. 2001, pp. 582-590.

*Primary Examiner* — Jimmy H Tran
(74) *Attorney, Agent, or Firm* — Kunzler, PC

(57) ABSTRACT

For predictive computing resource allocation in a distributed environment, a model module generating a model of computing resource usage in a distributed computer system having a plurality of geographically distributed nodes organized into a plurality of clusters, a demand module predicting future demand for computing resources, a cost module calculating an operation cost for each computing resource, an available resource module identifying a set of available computing resources in the computer system, a resource set module that determines a minimum cost set of computer resources capable of meeting the predicted demand based on the set of available computing resources and on operating costs, and an activation module that determines whether to activate or deactivate each of the plurality of nodes based on the set of computer resources capable of meeting the predicted demand.

20 Claims, 7 Drawing Sheets

(56) References Cited

U.S. PATENT DOCUMENTS

| | | | | |
|---|---|---|---|---|
| 9,032,175 B2* | 5/2015 | Gao | G06F 12/02 | |
| | | | 711/165 | |
| 9,264,376 B2* | 2/2016 | Madduri | G06F 9/5011 | |
| 9,635,134 B2* | 4/2017 | Cao | H04L 67/322 | |
| 2006/0184939 A1* | 8/2006 | Sahoo | G06F 9/505 | |
| | | | 718/100 | |
| 2007/0239747 A1* | 10/2007 | Pepper | G06F 17/30864 | |
| 2009/0086945 A1* | 4/2009 | Buchanan | H04M 3/42289 | |
| | | | 379/201.02 | |
| 2010/0199036 A1* | 8/2010 | Siewert | G06F 3/0613 | |
| | | | 711/112 | |
| 2010/0325199 A1* | 12/2010 | Park | G06F 17/30067 | |
| | | | 709/203 | |
| 2011/0010514 A1* | 1/2011 | Benhase | G06F 3/061 | |
| | | | 711/162 | |
| 2011/0055385 A1* | 3/2011 | Tung | G06F 9/5072 | |
| | | | 709/224 | |
| 2011/0145153 A1* | 6/2011 | Dawson | G06Q 50/188 | |
| | | | 705/80 | |
| 2011/0295999 A1* | 12/2011 | Ferris | G06F 9/5072 | |
| | | | 709/224 | |
| 2012/0053925 A1 | 3/2012 | Geffin et al. | | |
| 2012/0072910 A1* | 3/2012 | Martin | G06F 9/45533 | |
| | | | 718/1 | |
| 2012/0124211 A1* | 5/2012 | Kampas | G06F 9/50 | |
| | | | 709/226 | |
| 2012/0158821 A1* | 6/2012 | Barros | G06F 9/5055 | |
| | | | 709/203 | |
| 2012/0226808 A1* | 9/2012 | Morgan | G06F 9/5072 | |
| | | | 709/226 | |
| 2012/0290691 A1* | 11/2012 | Buendgen | G06F 9/5061 | |
| | | | 709/220 | |
| 2012/0290725 A1* | 11/2012 | Podila | G06F 9/5011 | |
| | | | 709/226 | |
| 2013/0106906 A1* | 5/2013 | Roche | G06T 11/206 | |
| | | | 345/629 | |
| 2013/0290538 A1* | 10/2013 | Gmach | G06F 9/50 | |
| | | | 709/226 | |
| 2014/0031956 A1 | 1/2014 | Slessman et al. | | |
| 2014/0096121 A1* | 4/2014 | Joshi | G06F 8/65 | |
| | | | 717/170 | |
| 2014/0143846 A1* | 5/2014 | Tidd | H04L 63/0815 | |
| | | | 726/8 | |
| 2014/0244843 A1* | 8/2014 | Cao | H04L 67/322 | |
| | | | 709/226 | |
| 2014/0325076 A1* | 10/2014 | Madduri | G06F 9/5011 | |
| | | | 709/226 | |
| 2014/0351505 A1* | 11/2014 | Chiu | G06F 3/061 | |
| | | | 711/114 | |
| 2015/0039837 A1* | 2/2015 | Quan | G06F 3/061 | |
| | | | 711/136 | |
| 2015/0278243 A1* | 10/2015 | Vincent | G06F 17/30194 | |
| | | | 707/634 | |
| 2016/0105489 A1* | 4/2016 | Llorca | H04L 67/10 | |
| | | | 709/226 | |
| 2016/0226955 A1* | 8/2016 | Moorthi | G06Q 10/06 | |

* cited by examiner

| 400 Node-Level Data | |
|---|---|
| Data Storage Consumption | 402 |
| Data Storage Read/Write Throughput | 404 |
| Data Storage Read/Write IOPS | 406 |
| Computational Core Utilization | 408 |
| Computational Latency | 410 |
| Memory Consumption for Non-Cached Processes | 412 |
| Network Latency | 414 |
| Network Throughput | 416 |

FIG. 4A

| 420 Node Information | |
|---|---|
| Node ID | 422 |
| Node Location | 424 |
| Active Node Costs | 426 |
| Number of Hosted Resources | 428 |
| Resource ID | 430 |
| Resource Operation Cost | 432 |
| Resource ID | 430 |
| Resource Operation Cost | 432 |

FIG. 4B

| 440 Cluster-Level Data | |
|---|---|
| Current # of Nodes | 442 |
| Idle Node Tracking | 444 |
| Nodes Available to be Activated | 446 |
| Node Level Transactional Latency | 448 |

FIG. 4C

| 450 Cloud-Level Data | |
|---|---|
| Current # of Clusters | 452 |
| Idle Cluster Tracking | 454 |
| Clusters Available to be Activated | 456 |
| Cluster Level Transactional Latency | 458 |
| Current Cost of Resources | 460 |
| Geographical Locations of Available Resources | 462 |

FIG. 4D

PREDICTIVE COMPUTING RESOURCE ALLOCATION FOR DISTRIBUTED ENVIRONMENTS

FIELD

The subject matter disclosed herein relates to computing resource allocation and more particularly relates to predictive computing resource allocation for distributed environments.

BACKGROUND

Computer networks are an integral part of many businesses. Business networks now span the globe while providing services to the farthest reaches.

SUMMARY

A method for predictive computing resource allocation in a distributed environment is disclosed. An apparatus and computer program product also perform the functions of the method.

The method includes modelling resource usage in a computer system, the computer system comprising a plurality of geographically distributed nodes organized into a plurality of clusters, each node providing at least one computing resource, and each cluster comprising at least two of the plurality of nodes, predicting a resource requirement in a computer system based on the modelled resource usage, identifying available computing resources in the computer system capable of meeting the predicted resource requirement, calculating a resource cost of each computing resource in the computer system, determining a least expensive set of resources that meets the predicted resource requirement based on the available computing resources and the calculated resource cost of each available computing resource, and allocating available computing resources from the least expensive set of resources to meet the predicted resource requirement based on resource cost.

The apparatus includes a model module that generates a model of computing resource usage in a distributed computer system, wherein the distributed computer system comprises a plurality of geographically distributed nodes organized into a plurality of clusters, each cluster comprising at least two of the plurality of nodes, a demand module that predicts future demand for computing resources in the distributed computer system, a cost module that calculates an operating cost for each computing resource in the computer system, wherein each node provides at least one computing resource, an available resource module that identifies a set of available computing resources in the computer system, a resource set module that determines a minimum cost set of computer resources capable of meeting the predicted demand based on the set of available computing resources and on operating costs, and an activation module that determines whether to activate or deactivate each of the plurality of nodes based on the set of computer resources capable of meeting the predicted demand, wherein at least a portion of the model module, demand module, cost module, available resource module, resource set module, and activation module comprise one or more of hardware and executable code, the executable code stored on one or more computer readable storage media.

The computer program product includes a computer readable storage medium having program instructions embodied therewith, the program instructions readable/executable by a processor to cause the processor to: generate, by processor, a model of computing resource usage in a distributed computer system, wherein the distributed computer system comprises a plurality of geographically distributed nodes organized into a plurality of clusters, each cluster comprising at least two of the plurality of nodes, predict, by processor, future demand for computing resources in the distributed computer system, calculate, by processor, an operation cost for each computing resource in the computer system, wherein each node provides at least one computing resource, identify, by processor, a set of available computing resources in the computer system, determine, by processor, a minimum cost set of computer resources capable of meeting the predicted demand based on the set of available computing resources and on operating costs, and determine, by processor, whether to activate or deactivate each of the plurality of nodes based on the set of computer resources capable of meeting the predicted demand.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A is a schematic block diagram illustrating one embodiment of node-level usage data in accordance with one embodiment of the present invention;

FIG. 4B is a schematic block diagram illustrating one embodiment of a node information table in accordance with one embodiment of the present invention;

FIG. 4C is a schematic block diagram illustrating one embodiment of cluster-level usage data in accordance with one embodiment of the present invention;

FIG. 4D is a schematic block diagram illustrating one embodiment of cloud-level usage data in accordance with one embodiment of the present invention;

DETAILED DESCRIPTION

Figure 1:
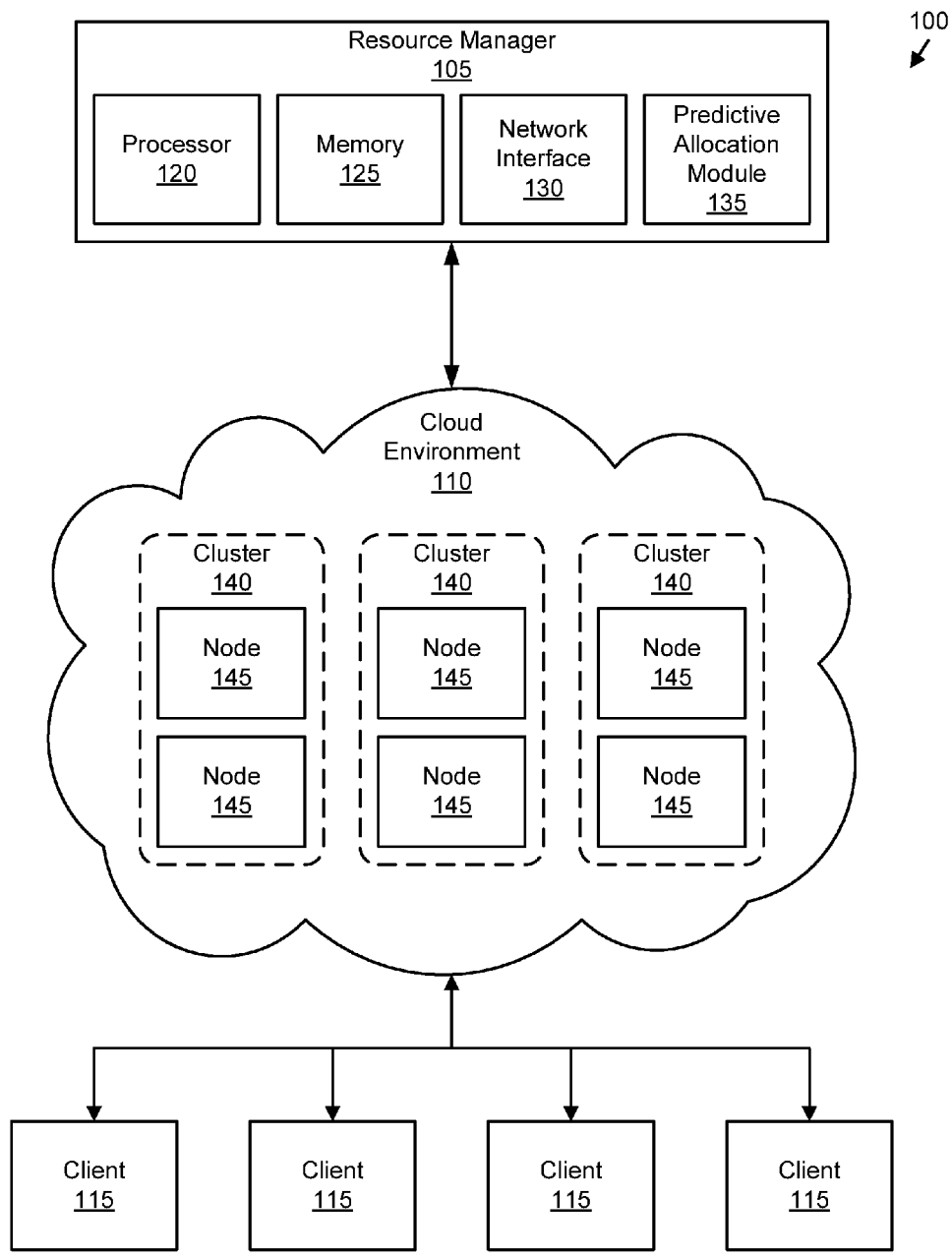
FIG. 1 is a schematic block diagram illustrating one embodiment of a computer system for predictive computing resource allocation in a distributed environment, in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers, and network software that have been tested to work with the computer program product. Those operating systems, version numbers, and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 is a schematic block diagram illustrating one embodiment of a data processing system 100. The data processing system 100 may include a resource manager 105, a cloud environment 110, and a plurality of user devices 115. A user device 115 may be any computer device or computer system capable of interacting with the cloud environment 110. Interactions between a user device 115 and the cloud environment 110 may include, but are not limited to, processing tasks, storage tasks, data retrieval tasks, and the like. In one embodiment, a user device 115 may include a client terminal, a desktop computer, a laptop computer, a tablet computer, a mobile device, a smart phone, or other computing device.

The resource manager 105 includes a processor 120, a memory 125, a network interface 130, and a predictive allocation module 135. The processor 120, in one embodiment, may include any known controller capable of executing computer-readable instructions and/or capable of performing logical operations. For example, the processor 120 may be a microcontroller, a microprocessor, a central processing unit (CPU), a graphics processing unit (GPU), an auxiliary processing unit, a field programmable gate array (FPGA), or similar programmable controller. In some embodiments, the processor 120 executes instructions stored in the memory 125 to perform the methods and routines described herein. The processor 120, in one embodiment, is communicatively coupled to the memory 125, the network interface 130, and the predictive allocation module 135.

The memory 125, in one embodiment, is a computer readable storage medium. In some embodiments, the memory 125 includes volatile computer storage media. For example, the memory 125 may include a random access memory (RAM), including dynamic RAM (DRAM), synchronous dynamic RAM (SDRAM), and/or static RAM (SRAM). In some embodiments, the memory 125 includes non-volatile computer storage media. For example, the memory 125 may include a hard disk drive, a flash memory, or any other suitable non-volatile computer storage device. In some embodiments, the memory 125 includes both volatile and non-volatile computer storage media.

In some embodiments, the memory 125 stores data relating to predictive computing resource allocation in a distributed environment. For example, the memory 125 may store computing resource usage data, computing resource usage models, computing resource requirements related to one or more users, computing resource operating costs, computing resource allocations, and the like. In some embodiments, the memory 125 also stores program code and related data, such as an operating system or other controller algorithms operating on the server 101.

The network interface 130, in one embodiment, includes software and/or hardware connecting the resource manager 105 to the cloud environment 110. For example, the network interface 130 may include a physical network adapter and one or more protocol stacks for communicating with nodes of the cloud environment 110 using computer networking protocols. In one embodiment, the network interface 130 may include a wireless networking interface that connects the resource manager 105 to the cloud environment 110 over radio or other wired or wireless communication mediums. In another embodiment, the network interface 130 may include a wired or fiber optic interface for connecting to the cloud environment 110.

The predictive allocation module 135, in one embodiment, is configured to generate a model of computing research usage in the cloud environment 110, predict future demand for computing resources in the cloud environment 110, operating cost for computing resources in the cloud environment 110, identify available computing resources in the cloud environment 110, and determine a minimum cost set of computer resources in the cloud environment 110 capable of meeting the predicted demand. In one embodiment, the predictive allocation module 135 may allocate available computing resources from the minimum cost set to meet demand for computing resources in the cloud environment 110. In another embodiment, the predictive allocation module 135 may determine whether to activate or deactivate a node 145 in the cloud environment 110 based on operating costs and the predicted demand for computing resources.

The predictive allocation module 135 may include computer hardware, computer software, or a combination of both computer hardware and computer software. For example, the predictive allocation module 135 may include circuitry, or a processor, configured to receive a search query. As another example, the predictive allocation module 135 may comprise computer program code that allows the processor 120 to identify a cluster of related user-generated content. The predictive allocation module 135 is discussed in further detail with reference to FIG. 2, below.

The cloud environment 110 may perform a variety of computing tasks (e.g., processing tasks, storage tasks, data retrieval tasks, and the like) using one or more computing resources on behalf of a user device 115. The cloud environment 110 includes a plurality of geographically distributed nodes 145 organized into a plurality of clusters 140. Each cluster 140 includes at least two of the plurality of nodes 145, wherein the nodes 145 of a cluster 140 are configured to perform a common computing task. A cluster 140 may be a logical arrangement of nodes 145 that perform a specific computing task. Accordingly, in one embodiment, each type of computing task available on the cloud environment 110 may be associated with its own cluster 140.

Each node 145 includes one or more computing resources for performing a computing task. For example, a node 145 may include a processor and memory for performing the computing task. In some embodiments, a node 145 is configured to perform a single computing task. In other embodiments, a node 145 is configured to perform a variety of computing tasks. For example, a node 145 may include a plurality of computing resources, each computing resource configured to perform a different computing task. In another example, a node 145 may include two or more computing resources configured to perform a common computing task.

Each node 145 may be associated with an operating cost, which is the cost to a provider of the cloud environment 110 for operating, maintaining, and providing the services of the node 145. In some embodiments, the operating cost of particular node 145 is based on the geographical location of the particular node 145. As the cloud environment 110 includes a plurality of geographically distributed nodes 145, operating costs will vary within the cloud environment 110 according to geography. Further, the operating cost of a node 145 may also be based on the number and/or type of computing resources provided by the node 145.

In one embodiment, the resource manager 105 monitors computing resource usage within the cloud environment 110. The resource manager 105 may collect and store computing resource usage data. Based on collected data, the research monitor 105 may create one or more models that describe computer resource usage within the cloud environment 110. These models may then be used to accurately predict resources necessary and large scale resource environment pools that have variable transactional workloads. Examples of large-scale research environment pools include, but are not limited to, e-commerce, high-performance computing, and many other cloud-based services.

In one embodiment, the resource manager 105 calculates operating costs and predictively allocates computing resources of the cloud environment 110 on a least-cost basis to meet upcoming demand by the user devices 115. The resource manager 105 may identify the lowest-cost computing resources capable of meeting performance requirements (e.g., capacity, latency, bandwidth, and/or throughput) for a particular user device 115 and allocate computing resources to reduce the overall economic cost of operating the cloud environment 110.

Beneficially, by accurately predicting resource requirements within these environments, the resource manager 105 will be able to activate computing resources before they are needed by the user devices 115, thereby reducing delay, and improving user experience as compared to conventional methods where resources are activated upon demand. Additionally, the resource manager 105 will achieve a reduction in overhead by only bringing online resources sufficient for the predicted workload, thereby further reducing operating costs of the cloud environment 110.

Figure 2:
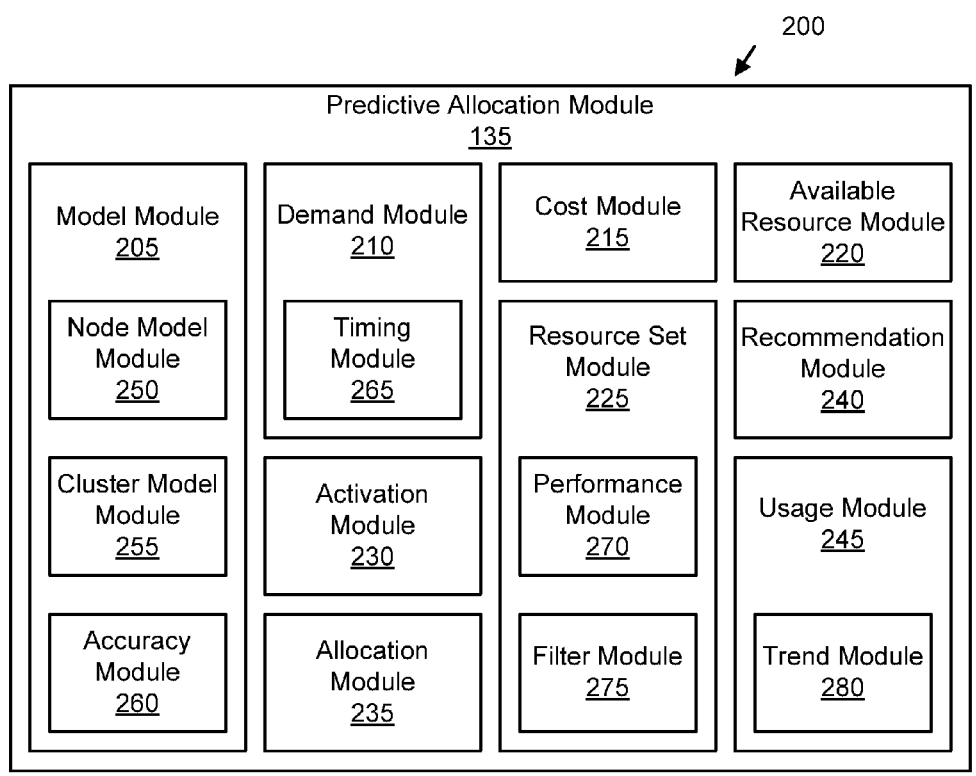
FIG. 2 is a schematic block diagram illustrating one embodiment of an apparatus for predictive computing resource allocation in a distributed environment, in accordance with one embodiment of the present invention.

FIG. 2 is a schematic block diagram illustrating one embodiment of an allocation apparatus 200. The allocation apparatus 200 includes a predictive allocation module 135, which may be substantially similar to the predictive allocation module 135 described above with reference to FIG. 1. In one embodiment, the predictive allocation module 135 includes a model module 205, a demand module 210, a cost module 215, an available resource module 220, a resource set module 225, and an activation module 230. In further embodiments, the predictive allocation module 135 may also include one or more of: an allocation module 235, a recommendation module 240, a usage module 245, a node model module 250, a cluster model module 255, an accuracy module 260, a timing module 265, a performance module 270, a filter module 275, and a trend module 280.

The modules 205-280 of the predictive allocation module 135 may include computer hardware, computer software, or a combination of both computer hardware and computer software. For example, in one embodiment, each module 205-280 may comprise a dedicated controller. In another example, one or more of the modules 205-280 may be implemented on a specialized processor, while others of the modules 205-280 are implemented as executable code stored on one or more computer readable storage media. In one embodiment, the modules 205-280 are connectively coupled to one another, for example, via a computer bus or other communication means.

The model module 205, in one embodiment, is configured to generate a model of computing resource usage in a distributed computer system. In certain embodiments, the distributed computer system is substantially similar to the cloud environment 110, having a plurality of geographically distributed nodes organized into a plurality of clusters, each cluster comprising at least two of the plurality of nodes. The model module 205 analyzes data regarding computing resource usage in the distributed computer system in order to generate at least one model of computing resource usage.

Generally, the model module 205 produces models that accurately depict storage, memory, and computational consumption in the cloud environment 110. The models may simulate computing resource usage at the node-level, the cluster-level, and/or at the cloud-level. In some embodiments, the models simulate computing resource demand and/or usage based on the geography of a user device 115 and/or of a node 145. The model module 205 identify historical instances of overuse and/or underuse, may identify usage thresholds, and may identify patterns of computing resource usage based on time and/or geography.

In some embodiments, the models produced by the model module 205 include a set of adjustment equations that describe the state of the cloud environment 110. In other embodiments, the models produced by the model module 205 include a series of recommendations and trends that fit a particular situation. The models of computing resource usage generated by the model module 205 are used by the demand module 210 to predict future computing resource requirements within the cloud environment 110. The models of computing resource usage may also be used by the available resource module 220 to identify sets of available computing resources.

In certain embodiments, the model module 205 further comprises a node model module 250 and/or a cluster model module 255. The node model module 250 may be used to intelligently manage resource allocation at the individual node-level, while the cluster model module 255 may be used to optimize communications and task allocations between the nodes 145 of a cluster 140, so as to ensure accurate resource allocation and to reduce latency.

The node model module 250, in one embodiment, is configured to model storage, memory, and computational consumption of the plurality of nodes based on node-level usage data. In some embodiments, the node model module 250 produces one or more models of storage, memory, and computational consumption within the nodes 145 the cloud environment 110. The node model module 250 may generate the one or more node-level models based on node-level usage data collected by the usage module 245. Node-level usage data is discussed in further detail below, with reference to FIG. 4A. In certain embodiments, the model module 205 may incorporate models produced by the node model module 250 in modeling overall of computing resource usage in the cloud environment 110.

The cluster model module 255, in one embodiment, is configured to predict resource allocation among the nodes and the shared resources of each cluster based on the cluster-level usage data. In some embodiments, the cluster model module 255 produces one or more models of resource allocation within the clusters 140 of the cloud environment 110. The cluster model module 255 may generate the one or more cluster-level models based on cluster-level usage data collected by the usage module 245. Cluster-level usage data is discussed in further detail below, with reference to FIG. 4C. In certain embodiments, the model module 205 may incorporate the models produced by the cluster model module 255 in modeling overall of computing resource usage in the cloud environment 110. The cluster-level models may further be used to activate and/or deactivate nodes dynamically dependent on the current requirements and predicted demand.

In certain embodiments, the model module 205 further comprises an accuracy module 260 configured to compare the current usage to resource demand predicted by the model of computing resource usage. The accuracy module 260 may receive usage predictions from the model module 205 and/or the demand module 210, as well as actual usage data from the usage module 245. The accuracy module 260 may further be configured to update one or more models of computing resource usage produced by the model module 205 based on the comparison.

The accuracy module 260 may continuously update and refine the models produced by the model module 205 through newly acquired data, identified trends, and user feedback. In some embodiments, the accuracy module 260 may assign an accuracy rating to a model produced by the model module 205. The accuracy rating may indicate a level of accuracy achieved by the particular model, wherein models may be ranked based on the accuracy rating. In one embodiment, the demand module 210 may use a model having a highest accuracy rating when predicting future demand for computing resources. In another embodiment, the activation module 230 may automatically (e.g., without administrator input/approval) activate and/or deactivate a particular node 145 based on a recommendation using a model having an accuracy rating above a certain threshold.

The demand module 210, in one embodiment, is configured to predict future demand for computing resources in the distributed computer system. The demand module 210 may predict a future resource requirement based on one or more models generated by the model module 205. In some embodiments, the demand module 210 may further predict the future resource requirement based on newly acquired computing resource usage data and/or newly identified trends of computing resource usage. In some embodiments, the demand module 210 predicts future resource requirements according to time and/or geography. For example, the demand module 210 may predict periods of high computer resource demand in particular regions.

In some embodiments, the demand module 210 predicts demand for computing resources hosted by a particular node 145 based on the models produced by node model module 250. For example, the demand module 210 may predict storage, memory, and/or computational consumption for the particular node 145. The predicted demand may be further based on geographies of the node 145 and performance requirements of the user devices 115. In certain embodiments, the resource set module 225 uses node-level predictions to intelligently manage resource allocation at the individual node-level.

In some embodiments, the demand module 210 predicts demand for computing resources hosted by a particular node 145 based on the models produced by cluster model module 255. For example, the demand module 210 may predict resource allocation amongst the nodes 145 of a particular cluster 140 and an amount of available nodes 145 and/or computing resources. The predicted demand may be further based on capacities of a cluster 140 and performance requirements of the user devices 115. In certain embodiments, the resource set module 225 uses cluster-level predictions to optimize resource allocations and reduce latency.

In certain embodiments, the demand module 210 includes a timing module 265 configured to identify a timing requirement for the predicted resource requirement. The timing requirement relates to specific time at which a user device 115 is predicted to need particular computing resources of the cloud environment 110. In some embodiments, the timing module 265 calculates a certainty factor that describes the likelihood that the user device 115 will request a particular computing resource at precisely the time indicated by the timing requirement. The certainty factor allows for a margin of error with regard to the timing requirement.

In some embodiments, the timing module 265 calculates an activation time for an inactive node 145 in the least expensive set of resources. The activation time indicates a time at which the activation module 230 activates an inactive node 145 such that the inactive node 145 will be online and operational prior to the user device 115 requiring computing resources of the inactive node 145. In certain embodiments, the activation time includes a buffer period based on the certainty factor. For example, a larger buffer period may be used for timing requirements having lower certainty factors and a smaller buffer period may be used for timing requirements having higher certainty factors.

The cost module 215, in one embodiment, is configured to calculate an operation cost for each computing resource in the computer system, wherein each node provides at least one computing resource. In some embodiments, the cost module 215 calculates a node cost for activating and/or operating a node 145, as well as an incremental resource cost for operating each computing resource in an activated node. The cost module 215 may calculate an overall cost for operating each node 145, for example, based on node geography and an amount and/or type of computing resources provided by the node. In some embodiments, the cost module 215 calculates a price per computation-unit that accounts for costs of operating a node and costs for providing a computing resource of the node.

In certain embodiments, the cost module 215 may calculate a current cost of system resources based on operating costs of each computing resource and current usage of the computing resources. In some embodiments, the cost module 215 compares operating cost to minimum performance requirements, such as latency. This analysis may allow the resource set module 225 to balance cost and performance when identifying a minimum cost set of computer resources.

The available resource module 220, in one embodiment, is configured to identify a set of available computing resources in the computer system. In one embodiment, the available computing resources comprise resources of inactive (e.g., deactivated) nodes 145 and unallocated resources of active, underutilized nodes 145. In another embodiment, the available computing resources comprise the cumulative computing resources of all activated or activatable nodes 145, but not computing resources that are unavailable due to maintenance, repair, etc. of corresponding nodes 145 or network connections. In a further embodiment, the available resource module 220 may identify a number of clusters 140 and/or nodes 145 available for activation.

In some embodiments, the available resource module 220 determines whether a particular available computing resource is capable of meeting current and/or predicted resource demand within the cloud environment 110. For example, the available resource module 220 may identify an unallocated resource, identify properties of the unallocated resource, and compare unallocated resource properties to minimum performance requirements in order to determine whether the unallocated resource is capable of meeting current and/or predicted resource demand.

The resource set module 225, in one embodiment, is configured to determine a minimum cost set of computing resources capable of meeting the predicted demand based on the set of available computing resources and on operating costs. As used herein, a minimum cost set of computer resources refers to the least expensive combination of computing resources of a plurality of combinations of computing resources capable of meeting the predicted demand. For example, a predicted resource requirement may require three nodes 145, wherein the minimum cost set a computer resources is the combination of three nodes in the cloud environment 110 having the lowest cost.

In one embodiment, the resource set module 225 analyzes cost performance of available computing resources, for example, based on geographic locations associated with the computing resources. The resource set module 225 may compare the cost of computing resources to latency, capacity, and other service requirements of the user devices 115, in order to determine the minimum cost set of computing resources capable of meeting the predicted resource requirement. In some embodiments, the resource set module 225 identifies a delay in providing services (e.g., due to the time required to activate a node 145) and determines a cost associated with the delay, wherein the minimum cost set is further based on costs associated with the delay.

In some embodiments, the resource set module 225 dynamically updates the minimum cost set based on updated predictions from the demand module 210, unpredicted trends determined by the usage module 245, updated costs associated with the computing resources (e.g., certain resources may be cheaper at certain times of day), and/or updated performance requirements of the user devices 115. For example, based upon current node usage, nodes with the highest available resources and bandwidth may be automatically selected to meet a requested task. In response to a node contribution level reaching a plateau, no further notes may be utilized for the task. Further, as the minimum cost set changes, network resources may be restructured to allow for nodes that are not contributing to particular task to be isolated from the task and deactivated no longer needed.

In certain embodiments, the resource set module 225 includes a performance module 270 configured to identify a set of minimum performance requirements associated with the predicted demand. In one embodiment, each of the user devices 115 is associated with at least one minimum performance requirement relating to obligations of the cloud environment 110 to provide services to the user device 115. In certain embodiments, the set of minimum performance requirements relate to contractual obligations of a provider of the cloud environment 110 with regard to the user devices 115.

The minimum performance requirements may relate to computational capacity, computational latency, data storage capacity, data storage throughput, data storage latency, network throughput, network latency, and the like. The performance module 270 may identify the set of minimum performance requirements, wherein the resource set module 225 may identify one or more combinations of available computing resources within the cloud environment 110 capable of meeting the set of minimum performance requirements.

In certain embodiments, the resource set module 225 includes a filter module 275 configured to remove nodes from the set of available resources in response to a node being unable to meet the set of minimum performance requirements associated with the predicted demand. For example, the filter module 275 may receive from the performance module 270 a set of minimum performance requirements. The filter module 275 may further determine whether a particular node 145 in the cloud environment 110 is capable of meeting minimum performance requirements for a particular user device 115.

In response to the particular node 145 being capable of meeting the minimum performance requirements for the particular user device 115, the filter module 275 retains that particular node 145 in a candidate pool of nodes 145 capable of meeting the set of minimum performance requirements. In some embodiments, a candidate pool is identified for each user device 115, as differing geographic locations and/or network connections among the user devices 115 and nodes 145 of the cloud environment 110 may result in only a subset of the nodes 145 being able to meet the minimum performance requirements for a particular user device 115. Further, different nodes 145 may be candidates for serving different user devices 115 as the different user devices 115 may be associated with different minimum performance requirements.

Otherwise, in response to the particular node 145 being unable to meet the minimum performance requirements for the particular user device 115, the filter module 275 removes the particular node 145 from the pool of candidate nodes 145. The resource set module 225 may then determine the least expensive set of resources capable of meeting the predicted demand for computing resources in the cloud environment 110 based on one or more pools of candidate nodes 145 associated with the user devices 115.

The activation module 230, in one embodiment, is configured to determine whether to activate or deactivate each of the plurality of nodes based on the set of computer resources capable of meeting the predicted demand. In some embodiments, the activation module 230 activates a lowest-cost node needed to meet rising demand for computing resources, based on an operating cost of an available, deactivated node 145. In some embodiments, the activation module 230 deactivates the highest cost node no longer needed to meet computing resource demand, based on an operating cost of an activated node 145. The activation module 230 may dynamically activate/deactivate nodes 145 in the cloud environment 110, or may periodically send activation/deactivation instructions according to a predefined schedule.

In some embodiments, instruction sent by the activation module 230 include an activation time, wherein a node 145 activates and/or deactivates at the activation time. In other embodiments, the activation module 230 sends the activation and/or the activation instruction according to the activation time. In one embodiment, the activation module 230 may calculate the activation time based on a timing requirement for the predicted resource requirement determined by the timing module 265. In another embodiment, the activation module 230 receives the activation time from the timing module 265.

In certain embodiments, the activation module 230 may send an instruction to a particular node 145, wherein the particular node 145 activates and/or deactivates responsive to the instruction. In some embodiments, the activation module 230 may send an instruction to a particular cluster 140, wherein the cluster 140 activates and/or deactivates a particular node 145 in response to the instruction. In a further embodiment, the activation module 230 may instruct an entire cluster 140 to activate and/or deactivate, wherein each node 145 of the cluster 140 activates and/or deactivates responsive to the instruction.

In some embodiments, the activation module 230 sends an indicator to the recommendation module 240 indicating whether to activate or deactivate a particular node 145, wherein the recommendation module 240 sends a node activation recommendation to an administrator of the cloud environment 110 based on the received indicator. The recommendation module 240 may further an indicator to the activation module 230 indicating an instruction/response received from the administrator, wherein the activation module 230 activates or deactivates the particular node 145 based on the instruction/response.

The allocation module 235, in one embodiment, is configured to allocate available computing resources from the least expensive set of resources to meet the predicted resource requirement based on computing resource cost. The allocation module 235 allocates computing resources to one or more user devices 115. In some embodiments, the allocation module 235 predictively allocates the computing resources to the one or more user devices 115 based on the predicted resource requirement. In other embodiments, the allocation module 235 allocates computing resources in response to request/demand from the one or more user devices 115.

In certain embodiments, the allocation module 235 may receive minimum performance requirements relating to a particular user device 115 and allocate available computing resources to meet the minimum performance requirements. In some embodiments, the allocation module 235 may rank nodes 145 and/or computing resources according to operating costs, whereby computing resources are first allocated from lowest-cost nodes (based on the node rankings) having unallocated resources.

In some embodiments, the allocation module 235 reallocates computing resources in the cloud environment 110 in order to minimize operating costs. For example, in response to declining demand from a particular user device 115, the allocation module 235 may reallocate computing resources so that a higher cost node 145 may be deactivated, thereby reducing operating costs of the cloud environment 110. The allocation module 235 reallocates the computing resources based on a least expensive set of resources capable of meeting the current resource requirements of the user devices 115. As a result of the reallocation, the activation module 230 may deactivate one or more highest-cost nodes that are no longer needed to meet current computing resource requirements.

The recommendation module 240, in one embodiment, is configured to sends a node activation recommendation to an administrator of the computer network. In certain embodiments, the node activation recommendation is a message recommending activation or deactivation of a particular node 145. For example, as the predictive allocation module 135 begins to model usage, predicts demand, and identify a set of resources capable of meeting predicted demand, a human administrator may oversee the process. Activation module 230 may require instructions from the human administrator prior to activating and/or deactivating a particular node 145 and the cloud environment 110.

In certain embodiments, the recommendation module 240 receives an instruction from the administrator, wherein the activation module 230 determines activates or deactivates the particular node based on the instruction. The node activation recommendations may be used to intelligently manage resource allocation in the cloud environment 110. In some embodiments, the node activation recommendations are based on predicted demand, current usage, historical models, current trends, and operating cost information received from one or more of the model module 205, demand module 210, cost module 215, available resource module 220, resource set module 225, and usage module 245. While depicted as a separate module, in one embodiment, the recommendation module 240 may be a component of the activation module 230, wherein the recommendation module 240 sends a recommendation based on a determination by the activation module 230 to activate and/or deactivate a node 145.

The usage module 245, in one embodiment, is configured to gathers node-level usage data for the plurality nodes and cluster-level usage data for the plurality of clusters, wherein the model module 205 generates one or more models of computing resource usage in the computer system based on node-level usage data and cluster-level usage data. In some embodiments, the usage module 245 further gathers cloud-level usage data for the cloud environment 110. The node-level usage data, the cluster-level usage data, and the cloud-level usage data collected by the usage module 245 is discussed in further detail below, with reference to FIGS. 4A, 4C, and 4D.

In some embodiments, the usage module 245 identifies a current resource usage of the computing system (e.g., the cloud environment 110). In some embodiments, the usage module 245 provides data regarding current and/or historical computing resource usage in the cloud environment 110 to the model module 205. In further embodiments, the accuracy module 260 may update models of computing resource usage based on usage data received from the usage module 245. The usage module 245 may store data regarding the current usage the memory 125. Gathered usage data may be used by the allocation module 235 to reallocate computing resources.

In certain embodiments, the usage module 245 include a trend module 280 configured to identify a current trend of increasing demand or of decreasing demand based on computing resource usage in cloud environment 110. In one embodiment, the trend module 280 determines overutilization and/or underutilization of computing resources in the cloud environment 110 based on computing resource usage data collected by the usage module 245. For example, the trend module 280 may examine a node-level model produced by the node model module 250 and/or node-level usage data collected by the usage module 250 to identify historical instances where resources were both over- and under-utilized. As another example, the trend module 280 may examine a cluster-level module and/or cluster-level usage data to identify historical trends among resource allocation within a cluster 140.

In some embodiments, the trend module 280 may identify trends that break away from computing resource usage predicted by the model module 205, wherein the activation module 230 may dynamically activate and/or deactivate one or more nodes 145 in response to a currently developing trend. In certain embodiments, the trend module 280 may perform a statistical analysis on the usage data to determine whether a trend represents just a statistically significant deviation from one or more models of computing resource usage.

Figure 3A:
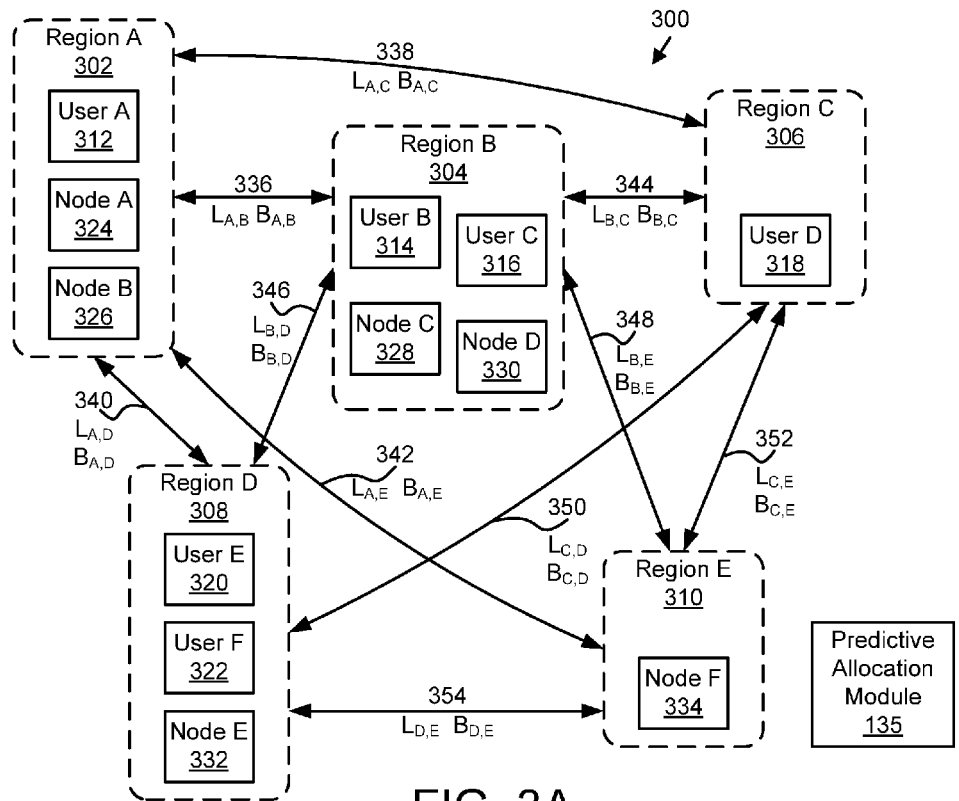
FIG. 3A is a schematic block diagram illustrating one embodiment of distributed computer system in accordance with one embodiment of the present invention.

FIG. 3A is a schematic block diagram illustrating one embodiment of distributed computer system 300, according to embodiments of the present disclosure. As depicted, the distributed computer system 300 includes a predictive allocation module 135, a plurality of regions 302-310, a plurality of users 312-322, a plurality of nodes 324-334, and a plurality of connections 336-354 between the different regions 302-310. The predictive allocation module 135 may be substantially as described above with reference to FIGS. 1 and 2. The regions 302-310 are geographically distributed. While the depicted embodiment shows five regions, six users, and six notes, in other embodiments the distributed computer system 300 may include more or fewer regions, users, and/or nodes.

In some embodiments, a region may include more nodes than users, such as Region A 302 containing a single user (User A 312) and two nodes (Node A 324 and Node B 326). In some embodiments, a region may include an equal number of users and nodes, such as Region B 304 containing two users (User B 314 and User C 316) and two nodes (Node C 328 and Node D 330). In some embodiments, a region may not include any nodes, such as Region C 306 containing a single user (User D 318) and no nodes. In some embodiments, a region include more users than nodes, such as Region D 302 containing a single user (User E 320 and User F 322) and one node (Node E 332). In some embodiments, a region may not include any users, such as Region E 306 containing a single node (Node F 334) and no users.

Region A 302 is connected to Region B 304 via connection 336, to Region C 306 via connection 338, to Region D 308 via connection 340, and to Region E 310 via connection 342. Region B 304 is further connected to Region C 306 via connection 344, to Region D 308 via connection 346, and to Region E 310 via connection 348. Region C is further connected to Region D 308 via connection 350, and to Region E 310 via connection 352. Region D 308 is further connected to Region E 310 via connection 354. Each connection 336-354 may be associated with a particular latency and bandwidth.

The predictive allocation module 135 governs resource allocation in the distributed computer system 300. For example, the predictive allocation module 135 may model computer resource usage among the users 312-322, predicts future demand for computing resources by the users 312-322, calculate an operation cost for operating computer resources in the nodes 324-334, identify available (e.g., assignable) computing resources in the nodes 324-334, and determine a minimum cost set of computer resources capable of meeting the current and predicted demand by the users 312-322. The predictive allocation module 135 may further allocate resources to the users 312-322 and that dynamically activate/deactivate one or more of the nodes 324-334 based on the current and predicted demand.

In some embodiments, Node A 324 may be an assignable to User D 318, for example, based on the performance requirements of the User D 318, on the number and/or types of computing tasks required by the User D 318, the latency and/or bandwidth of the link 338. Accordingly, the minimum cost set of computer resources does not include an allocation of resources in the Node A 324 to the User D 318. Instead, resources in one or more of the nodes 326-334 is allocated to the User D 318. In one embodiment, the minimum cost set of computer resources may include an allocation of resources in the Node A 324 to another of the users 312-322. In another embodiment, the minimum cost set of computer resources may not require the Node A 324, wherein the predictive allocation module 135 dynamically deactivates the Node A 324.

Figure 3B:
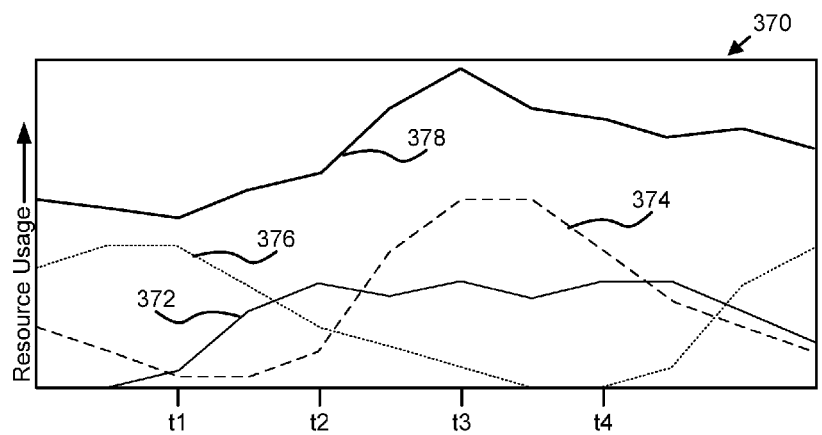
FIG. 3B is a graph illustrating one embodiment of computing resource demand in accordance with one embodiment of the present invention.

FIG. 3B is a graph 370 illustrating one embodiment of computing resource demand, according to embodiments of the present disclosure. The graph 370 tracks computing resource usage versus time. The graph 370 tracks resource usage of a first client 372, a second client 374, a third client 376, and overall resource usage 378. The three clients 372-376 may be located at geographically diverse locations. Additionally, the computing resources serving the three clients 372-376 may be geographically distributed and incur different operating costs, due in part to the geographic distribution.

In one embodiment, the graph 370 shows the maximum computing resource usage by the clients 372-376 over a specific time frame. In another embodiment, the graph 370 shows average to resource usage by the clients 372-376 over the specific time frame. In some embodiments, the graph 370 may be used to predict computing resource demand in a computer system, such as the cloud environment 110 and/or the distributed computer system 300.

The graph 370 depicts that overall resource usage 378 at a time t1 is at a minimum and usage is dominated by demands of the second client 374 and the third client 376. At time t2, resource usage by the first client 372 has increased while resource usage by the third client 376 is decreased. However, the overall usage 378 is greater at time t2 than at time t1. In some embodiments, the demand module 210 predicts increased demand between time t1 and time t2, the resource set module 225 identifies a lowest-cost set of resources for meeting the increased demand, and the activation module 230 activates additional nodes 145 based on the lowest-cost set of resources.

In one embodiment, the demand module 210 identifies decreased demand by the third client 376 between time t1 and t2, wherein a more expensive node 145 serving the third client 376 may be deactivated and a less expensive node 145 serving the first client 372 and/or the second client 374 may be activated, in order to minimize operating costs. In another embodiment, the resource set module 225 may reallocate computing resources between the clients 372-376 such that a node serving the third client 376 at time t1 is a reassigned to the first client 372 at time t2, in order to minimize overall operating costs due to decreased demand by the third client 376 and increased demand by the first client 372.

The graph 370 depicts that overall resource usage 378 at time t3 is at a maximum. Here, computing resource usage is dominated by the demands of the first client 372 and the second client 374. Between time t2 and time t3, the activation module 230 may activate one or more least expensive nodes 145 from a plurality of deactivated nodes 145 in order to meet the rising demand. In some embodiments, computing resources are reallocated among the three clients 372-376, in order to minimize overall operating costs. In further embodiments, computing resources may be reallocated among the three clients 372-376, in order to meet operating requirements of the second client 374 which has markedly increased demands between time t2 and time t3.

The graph 370 depicts that at time t4, the demands of the second client 374 have decreased from time t3, while the demands of the first client 372 and the third client 376 remain largely the same. Accordingly, overall usage 378 has decreased from time t3. In some embodiments, a more expensive node 145 serving the second client 374 may be deactivated, in order to minimize overall operating costs due to decreased demand. In certain embodiments, the decreased demand by the second client 374 may allow at least one less-expensive nodes 145, that were not otherwise able to meet the operating requirements of the second client 374, to replace at least one more-expensive node 145 previously needed to meet the operating requirements of the second client 374. Accordingly, by replacing more expensive nodes 145 with less-expensive nodes 145, the overall operating cost of the distributed computing system 300 may be minimized.

FIG. 4A is a schematic block diagram illustrating one embodiment of node-level usage data 400, according to embodiments of the present disclosure. The node-level usage data 400 describes computer resource usage among the plurality of nodes 145 in the cloud environment 110. In some embodiments, the node-level usage data 400 is collected by the usage module 255. The node-level usage data 400 may be organized as a data structure, such as a table, list, database, or the like. The node-level usage data 400 may be stored in the resource manager 105, the cloud environment 110, or in combinations thereof.

In the depicted embodiment, the node-level data 400 includes: data storage consumption 402, data storage read/write throughput 404, data storage read/write input/output-per-second (IOPS) 406, competition core utilization 408, computational latency 410, memory consumption for non-cached processes 412, network latency 414, and network throughput 416. The node-level data 400 may be used by the node model module 250 in modelling node resource usage. Additionally, the node-level data 400 may be used to identify an over-utilized or under-utilized node 145, wherein the resource set module 225 may manage resource allocation at the individual node-level based on the node-level data 400.

FIG. 4B is a schematic block diagram illustrating one embodiment of a node information table 420, according to embodiments of the present disclosure. The node information table 420 describes properties of a node 145 in the cloud computer environment 110. The node information table 420 may be organized as a data structure, such as a table, list, database, or the like. The node information table 420 may be stored in the resource manager 105, the cloud environment 110, or in combinations thereof.

In the depicted embodiment, the node information table 420 includes: a node identifier 422, node geographic location 424, active node cost 426, number of hosted resources 428, and a resource identifier 430, and a resource operation cost 432 for each hosted resource. The node geographic location 424 and resource identifiers 430 may be used by the resource set module 225 to determine whether the node can meet a part of the current and/or predicted resource requirements and the cloud environment 110. The active node cost 426 and resource operation costs 432 may be used by the resource set module 225 in determining whether a combination of resources including the node is the minimum cost set of resources capable of meeting the current and/or predicted resource requirements.

FIG. 4C is a schematic block diagram illustrating one embodiment of cluster-level usage data 440, according to embodiments of the present disclosure. The cluster-level usage data 440 describes mid-level computer resource usage in the cloud environment 110. In particular, the cluster-level usage data 440 may describe interactions between the plurality of nodes 145 in a cluster 140 of the cloud environment 110. In some embodiments, the cluster-level usage data 440 is collected by the usage module 255. The cluster-level usage data 440 may be organized as a data structure, such as a table, list, database, or the like. The cluster-level usage data 440 may be stored in the resource manager 105, the cloud environment 110, or in combinations thereof.

In the depicted embodiment, the cluster-level data 440 includes: the current number of nodes in the cluster 442, idle node tracking data 444, nodes available to be activated 446, and node-level transactional latency 448. The cluster-level data 440 may be used to optimize paths between nodes 145, model resource allocation among nodes 145, identify shared resources and a cluster 140, reduce latency within the cluster 140, and to activate/deactivate nodes dynamically dependent upon the current requirements and recommendations.

FIG. 4D is a schematic block diagram illustrating one embodiment of cloud-level usage data 450, according to embodiments of the present disclosure. The cloud-level usage data 450 describes high-level computer resource usage in the cloud environment 110. In particular, the cloud-level usage data 450 may describe interactions between the plurality of clusters 140 in the cloud environment 110. In some embodiments, the cloud-level usage data 450 is collected by the usage module 255. The cloud-level usage data 450 may be organized as a data structure, such as a table, list, database, or the like. The cloud-level usage data 450 may be stored in the resource manager 105, the cloud environment 110, or in combinations thereof.

In the depicted embodiment, the cloud-level data 450 includes: the current number of clusters 452, idle cluster tracking data 454, clusters available to be activated 456, cluster-level transactional agency 458, current cost of resources 460, and geographical locations of available resources 462. The cloud-level data 450 may be used by the predictive allocation module 1352 enhance overall latency within the cloud environment 110 and to optimized cost of resources across multiple environments. The cloud-level data for 50 may further be used to identify historical trends within the cloud environment 110 and to produce models that accurately depict resource allocation amongst the plurality of geographically dispersed nodes 145 and clusters 140.

Figure 5:
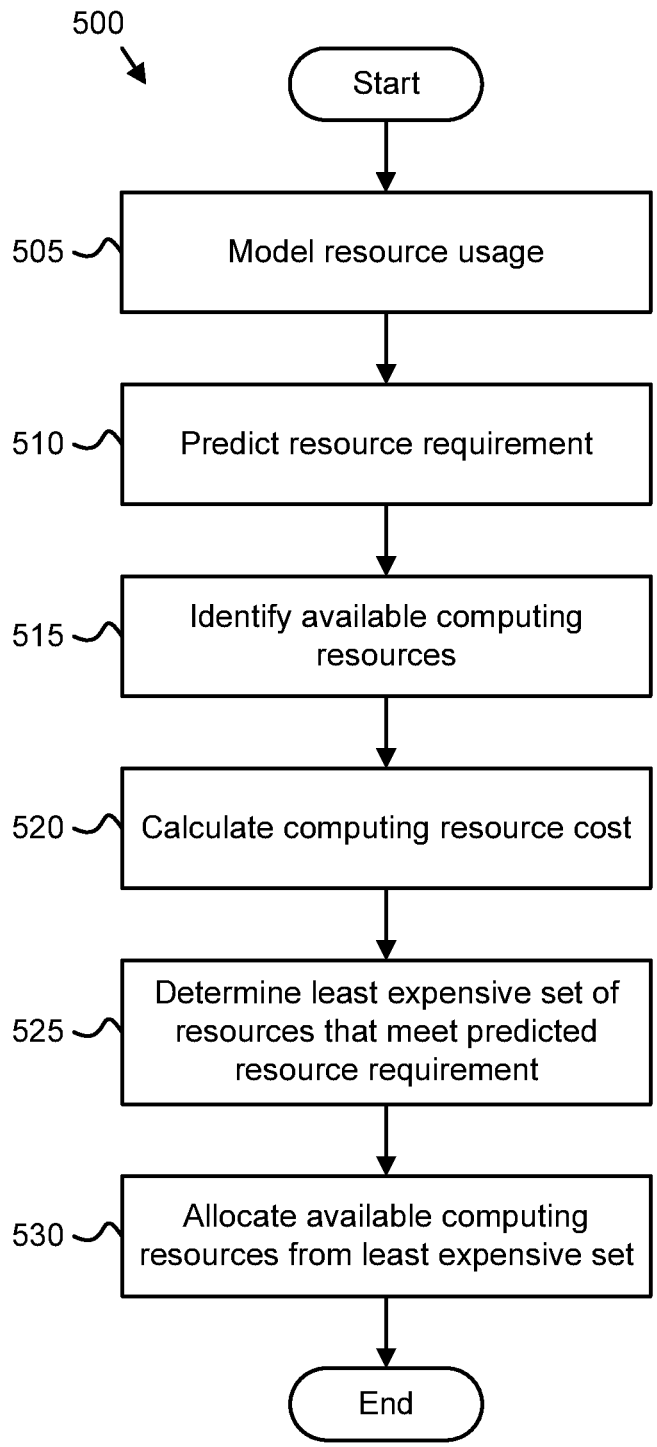
FIG. 5 is a schematic flow chart diagram illustrating one embodiment of a method for predictive computing resource allocation in a distributed environment, in accordance with one embodiment of the present invention.

FIG. 5 is a schematic flow chart diagram illustrating one embodiment of a method 500 for predictive computing resource allocation in a distributed environment. The method 500 may be performed using the predictive allocation module 135. Alternatively, the method 500 may be performed by a computer program product. The computer program product may comprise a computer readable storage medium having program instructions embodied therein. The computer readable storage medium may be the memory 125, the storage node 145, a network storage device in the cloud environment 110, or combinations thereof. The program instructions may be readable/executable by the processor 120 to perform the method 500.

The method 500 starts, and in one embodiment, the model module 205 models 505 resource usage in a computer system, such as the data processing system 100. In some embodiments, the modelling resource usage in the computer system includes collecting node-level resource usage data from a plurality of nodes 145 and cluster-level resource usage data from a plurality of clusters 140. In further embodiments, modelling resource usage in the computer system may include collecting cloud-level resource usage data from the cloud environment 110. Based on the modelled resource usage, the demand module 210 predicts 510 a resource requirement in the computer system. In one embodiment, the resource requirement is a prediction of future demand in addition to a current requirement. In another embodiment, the resource requirement is a prediction of overall resource demand at a future point.

The available resource module 220 identifies 515 available computing resources in the computer system (e.g., in the cloud environment 110). In one embodiment, the available computing resources comprise resources of inactive (e.g., deactivated) nodes 145 and unallocated resources of active nodes 145. In another embodiment, the available computing resources comprise the cumulative computing resources of all activated or activatable nodes 145, but not computing resources that are unavailable due to maintenance, repair, etc. of corresponding nodes 145 or network connections. The cost module 215 calculates 520 a resource cost of each computing resource in the computer system. In some embodiments, calculating 520 a resource cost of each computing resource includes calculating a node cost for activating a node 145 associated with the computing resource and calculating an incremental resource cost for operating each computing resource in an (already) activated node.

The resource set module 225 determines 525 a least expensive set of resources that meets the predicted resource requirement based on the available computing resources and the calculated resource cost of each available computing resource. In certain embodiments, determining 525 the least expensive set of resources includes generating a plurality of combinations of nodes 145 capable of meeting the predicted resource requirement, calculating a total cost for each of the plurality of combinations of nodes 145, and selecting a combination of nodes 145 having the lowest total operating cost. The allocation module 235 then allocates 530 available computing resources from the least expensive set of resources to meet the predicted resource requirement based on resource cost. The method 500 ends.

Figure 6:
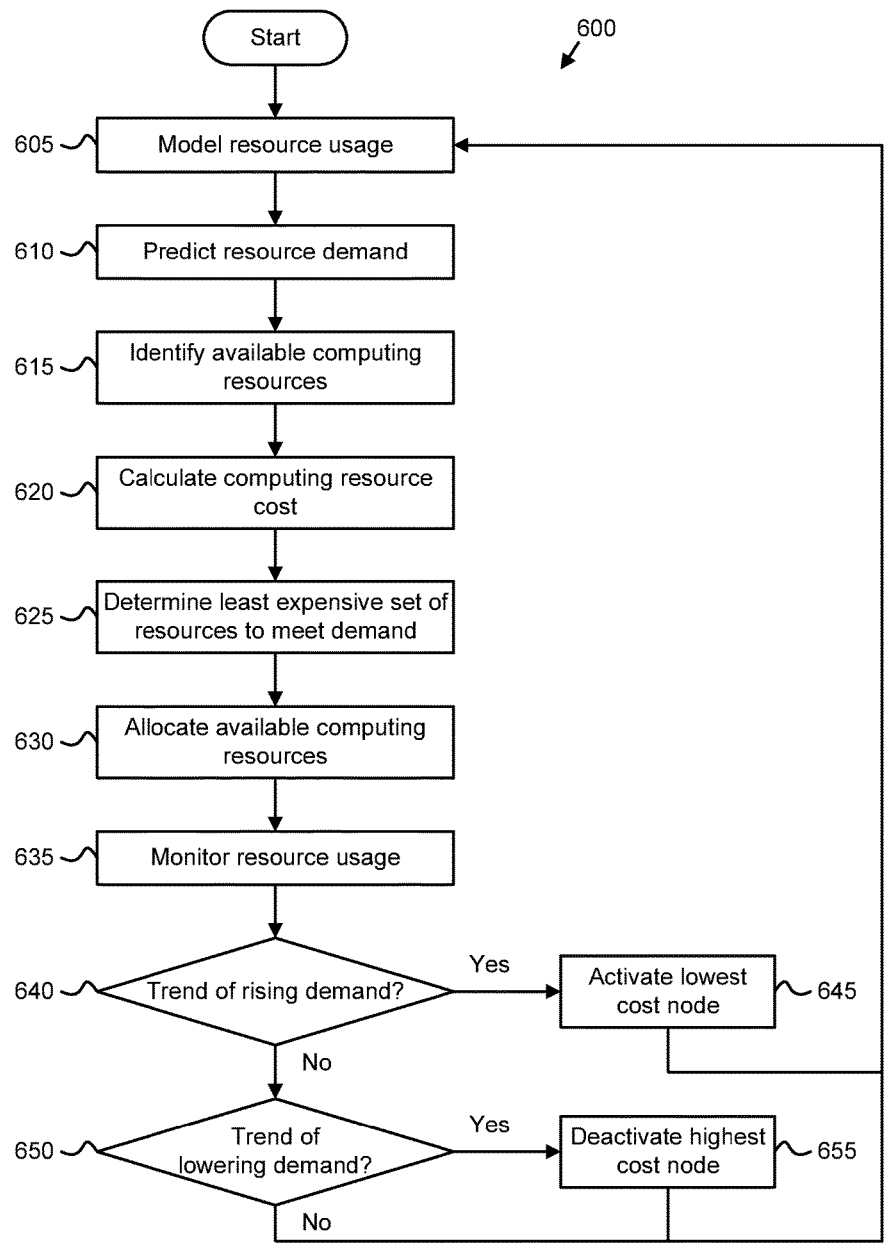
FIG. 6 is a schematic flow chart diagram illustrating one embodiment of another method for predictive computing resource allocation in a distributed environment, in accordance with one embodiment of the present invention.

FIG. 6 is a schematic flow chart diagram illustrating one embodiment of a method 600 for predictive computing resource allocation in a distributed environment. The method 600 may be performed using the predictive allocation module 135. Alternatively, the method 600 may be performed by a computer program product. The computer program product may comprise a computer readable storage medium having program instructions embodied therein. The computer readable storage medium may be the memory 125, the storage node 145, a network storage device in the cloud environment 110, or combinations thereof. The program instructions may be readable/executable by the processor 120 to perform the method 600.

The method 600 starts, and in one embodiment, the model module 205 models 605 resource usage in a computer system, such as the data processing system 100. In some embodiments, the modelling 605 resource usage in the computer system includes generating one or more models of computing resource usage from collected resource usage data. In one embodiment, the collected resource usage data and/or the one or more models of computing resource usage are stored at one or more nodes 145 in the cloud environment 110. Based on the modelled resource usage, the demand module 210 predicts 610 a resource demand in the computer system. In some embodiments, the resource demand includes one or more operating requirements (e.g., capacity, latency, bandwidth, and/or throughput) of a user device 115 requesting computing tasks of the computer system.

The available resource module 220 identifies 615 available computing resources in the computer system (e.g., in the cloud environment 110), including computing resources of activated and deactivates nodes 145. The cost module 215 calculates 620 a resource cost of each computing resource in the computer system. In some embodiments, calculating 620 the resource cost of each computing resource includes identifying a geographic location of a node 145 providing the computing resource, wherein the resource cost is based on the geographic location.

The resource set module 225 determines 625 a least expensive set of resources that meets the predicted resource demand (including the operating requirements) based on the available computing resources and the calculated resource cost of each available computing resource. The allocation module 235 then allocates 630 available computing resources from the least expensive set of resources to meet the predicted resource requirement based on resource cost. The usage module 255 monitors 635 usage of the computing resources in the computer system.

The trend module 245 determines 640 whether there is a trend of rising computing resource demand in the computer system. In some embodiments, determining 645 whether there is a trend of rising demand includes analyzing usage data collected by the usage module 255. If the trend module 245 determines 640 that there is a trend of rising demand, then the activation module 230 activates 645 a lowest cost node 145 capable of meeting the rising demand. Otherwise, if the trend module 245 determines 640 that there is not a trend of rising demand, then the trend module 245 determines 650 whether there is a trend of lowering computer resource demand in the computer system.

In some embodiments, determining 650 whether there is a trend of lowering demand includes comparing actual computing resource usage (as measured by the usage module 255) to computing resource usage predicted by the model module 205. If the trend module 245 determines 650 that there is a trend of lowering demand, then the activation module 230 deactivates 655 a highest cost node 145 not needed to meet the lowering demand. Otherwise, if the trend module 245 determines 650 that there is not a trend of lowering demand, then the model module 205 continues to model 605 resource usage in a computer system, including updating models based on actual computing resource usage measured by the usage module 255.

In some embodiments, activating 645 the lowest cost node 145 includes the activation module 230 activates 645 the lowest cost node 145 based on resource costs of computing resources of the node 145 is calculated by the cost module 215. In response to activating 645 the lowest cost node 145, the model module 205 continues to model 605 resource usage in a computer system, including updating models based on actual computing resource usage measured by the usage module 255.

In some embodiments, deactivating 655 the highest cost node 145 includes the resource set module 225 determining whether lower cost nodes 145 can take over computing tasks currently performed by the highest cost node 145, wherein the allocation module 235 reallocates computing tasks currently performed by the highest cost node 145. In response to deactivating 655 the highest cost node 145, the model module 205 continues to model 605 resource usage in a computer system, including updating models based on actual computing resource usage measured by the usage module 255. In some embodiments, the method 600 continues to there is no longer demand for computing resources in the computer system and/or there are no available computing resources in the computer system.

Figure 7:
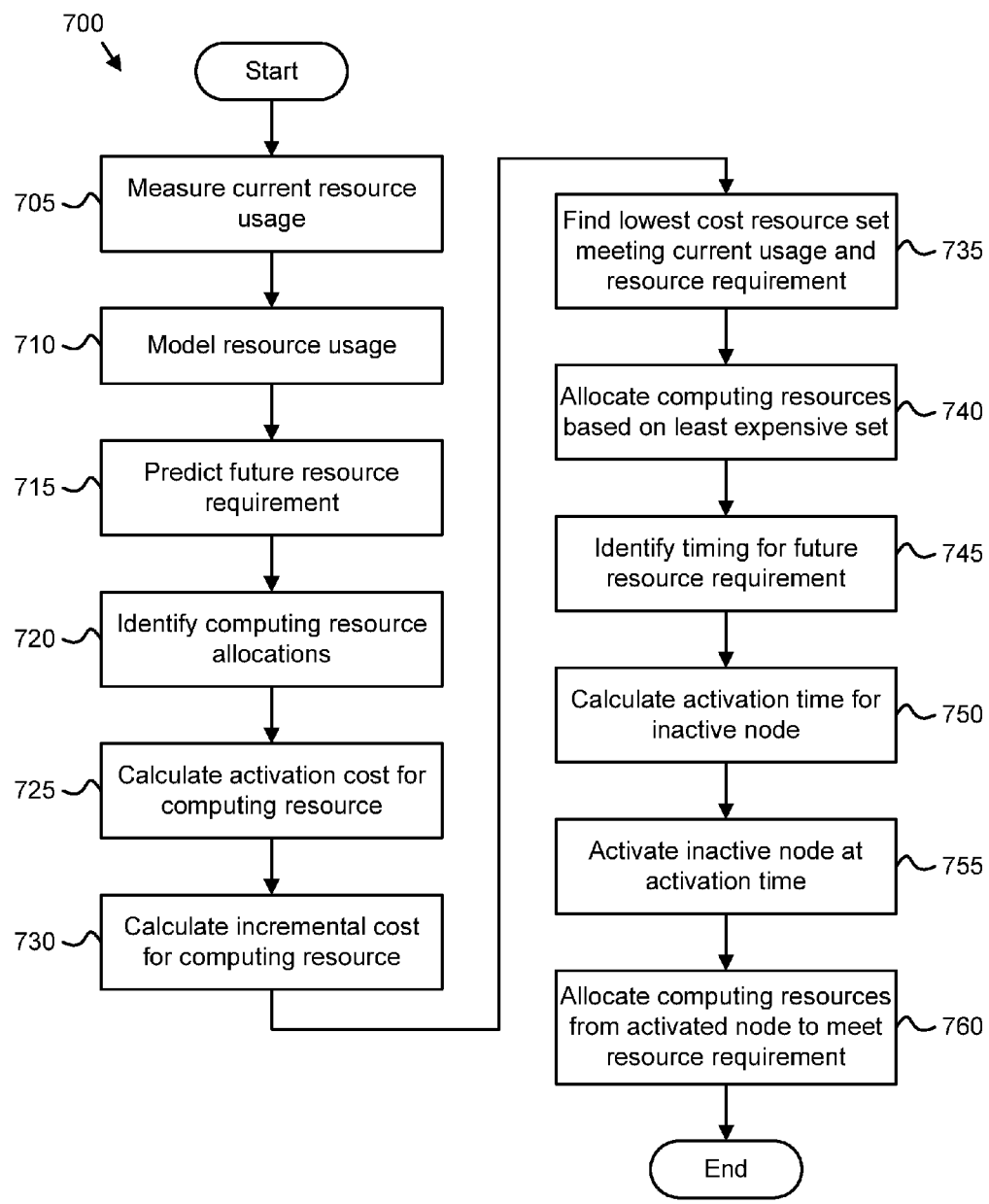
FIG. 7 is a schematic flow chart diagram illustrating one embodiment of yet another method for predictive computing resource allocation in a distributed environment, in accordance with one embodiment of the present invention.

FIG. 7 is a schematic flow chart diagram illustrating one embodiment of a method 700 for predictive computing resource allocation in a distributed environment. The method 700 may be performed using the predictive allocation module 135. Alternatively, the method 700 may be performed by a computer program product. The computer program product may comprise a computer readable storage medium having program instructions embodied therein. The computer readable storage medium may be the memory 125, the storage node 145, a network storage device in the cloud environment 110, or combinations thereof. The program instructions may be readable/executable by the processor 120 to perform the method 700.

The method 700 starts and the usage module 255 monitors 705 usage of the computing resources in the computer system (e.g., the cloud environment 110). In some embodiments, measuring 705 current resource usage includes collecting usage data from the cloud environment 110, including node-level data from the plurality of nodes 145 and cloud-level data from the plurality of clusters 140. Based on the collected data, the model module 205 models 710 resource usage in the computer system. In some embodiments, the modelling 710 resource usage in the computer system includes generating one or more models of computing resource usage from collected resource usage data. In one embodiment, the collected resource usage data and/or the one or more models of computing resource usage are stored at one or more nodes 145 in the cloud environment 110.

Based on the modelled resource usage, the demand module 210 predicts 715 a resource demand in the computer system. In some embodiments, the resource demand includes one or more operating requirements (e.g., capacity, latency, bandwidth, and/or throughput) of a user device 115 requesting computing tasks of the computer system. The available resource module 220 identifies 720 computing resources allocations in the computer system (e.g., in the cloud environment 110). In one embodiment, identifying 720 computing resource allocations includes identifying a plurality of computing resources already allocated to one or more user devices 115. In a further embodiment, identifying 720 computing resource allocations includes identifying unallocated computing resources, for example, unallocated computing resources in already activated nodes 145 and unallocated computing resources in the activated nodes 145.

The cost module 215 calculates 725 activation cost for computing resources in the computer system. In some embodiments, calculating 725 the activation cost includes identifying a node hosting the computing resource and determining an activation cost for that node. In further embodiments, calculating 725 the activation costs includes determining whether the node hosting the computer resource is in an activated or deactivated state, wherein the activation cost is zero in response to the node already being in an activated state.

The cost module 215 also calculates 730 an incremental cost for each computing resource, the incremental cost being a cost incurred by operating the computer resource in an already activated node. In some embodiments, the incremental cost includes a delivery cost associated with receiving computing resource requests and/or instructions from a client 115 and providing results to the client 115. The delivery cost may be based on a geographic location of the client 115 and a geographic location of the node 145 providing the computing resource.

The resource set module 225 determines 735 a least expensive set of resources that meets the current usage and the future resource requirement based on the available computing resources and the calculated resource cost of each available computing resource. In some embodiments, determining 735 the least expensive set of resources includes identifying operating requirements for each client device 115 contributing to the future resource requirement and determining a set of nodes 145 capable of meeting the operating requirements for each client device 115. In further embodiments, determining 735 the least expensive set of resources includes a ranking the set of nodes 145 capable of meeting operating requirements for a client device 115 based on activation costs and incremental costs for each node 145 in the set.

The allocation module 235 then allocates 740 available computing resources from the least expensive set of resources based on resource cost. In some embodiments, allocating 740 the available computing resources includes reallocating previously assigned computing resources to meet current usage based on the least expensive set. In certain embodiments, allocating 740 the available computing resources includes reserving computing resources for future demand as predicted by the resource requirement.

The timing module 265 identifies 745 timing requirement for the predicted resource requirement. For example, the timing module 265 may identify time at which a user device 115 is projected to request particular computing resources from the cloud environment 110. In some embodiments, identifying 745 the timing requirement includes calculating a certainty factor describing the likelihood that the user device 115 will request a particular computing resource at precisely the time indicated by the timing requirement.

Based on the timing requirement, the timing module 265 calculates 750 an activation time for an inactive node 145 in the least expensive set of resources. The activation time is a time at which the inactive node 145 should be activated such that the inactive node 145 will be online and operational prior to the timing requirement. In some embodiments, calculating 750 the activation time includes adding a buffer period based on the certainty factor, wherein a lower certainty factor (indicating a lower likelihood that the user device 115 will request particular computing resource at the precise time indicated by the timing requirement) results in a larger buffer period (and thus earlier node activation) than a higher certainty factor.

The activation module 230 activates 755 one or more inactive nodes at the activation time indicated by the timing module 265. In one embodiment, the activation module 230 activates 755 a least expensive inactive node capable of meeting the resource requirement at the activation time. The allocation module 235 allocates 760 computing resources from activated nodes to meet the predicted resource requirement. The method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a model module that generates a model of computing resource usage in a distributed computer system, wherein the distributed computer system comprises a plurality of geographically distributed nodes organized into a plurality of clusters, each node providing at least one computing resource, and each cluster comprising at least two of the plurality of nodes;
  a demand module that predicts a future resource requirement in the distributed computer system based on the model of computing resource usage;
  a cost module that calculates a resource cost for each computing resource in the computer system;
  an available resource module that identifies a set of available computing resources in the computer system capable of meeting the predicted future resource requirement;
  a resource set module that determines a least expensive set of computer resources capable of meeting the predicted future demand based on the set of available computing resources and on the calculated resource cost of each available computing resource;
  an allocation module that allocates available computing resources from the least expensive set of computer resources to meet the predicted future resource requirement based on resource cost;
  an activation module that deactivates one or more highest cost nodes not needed to meet the predicted future resource requirement,
  wherein at least a portion of the model module, demand module, cost module, available resource module, resource set module, allocation module, and activation module comprise one or more of hardware and executable code, the executable code stored on one or more computer readable storage media.

2. The apparatus of claim 1, further comprising a trend module that identifies a current trend of increasing demand or of decreasing demand based on computing resource usage in the distributed computer system, the trend module determining overutilization or underutilization of computing resources in the computer system based on computing resource usage data.

3. The apparatus of claim 1, further comprising a resource usage module that gathers node-level usage data for the plurality nodes and cluster-level usage data for the plurality of clusters, wherein the model of computing resource usage in the computer system is based on node-level usage data and cluster-level usage data.

4. The apparatus of claim 3, wherein the node-level usage data comprises one or more of: data storage consumption, data storage read/write throughput, data storage read/write input/output per second (TOPS), computational core utilization, computational latency, memory consumption for non-cached processes, network throughput, and network latency; and wherein the cluster-level usage data comprises one or more of: a total number of nodes in each cluster, a number of idle nodes in each cluster, a number of nodes available for activation, and node transactional latency.

5. The apparatus of claim 3, wherein the resource usage module further gathers cloud-level usage data for the computer system, the cloud-level usage data comprising one or more of: a total number of clusters, a number of idle clusters, a number of clusters available for activation, geographic locations of available resources, a current cost of system resources, cluster transactional latency, and a number of prepaid resource allocations.

6. The apparatus of claim 1, further comprising a recommendation module that sends a node activation recommendation to an administrator of the computer network, the node activation recommendation recommending activation or deactivation of a particular node, and receives an instruction from the administrator, wherein the activation module that determines activates or deactivates the particular node based on the instruction.

7. The apparatus of claim 1, wherein the available resource module comprises:
a performance module that identifies a set of minimum performance requirements associated with the predicted future demand; and
a filter module that removes nodes from the set of available resources in response to a node being unable to meet the set of minimum performance requirements associated with the predicted future demand.

8. The apparatus of claim 1, wherein the model module further comprises:
a node-level module that predicts storage, memory and computational consumption of the plurality of nodes based on the node-level usage data; and
a cluster-level module that predicts resource allocation among the nodes and the shared resources of each cluster based on the cluster-level usage data.

9. The apparatus of claim 1, further comprising an accuracy module that compares the current usage to resource demand predicted by the model of computing resource usage and updates the model of computing resource usage based on the comparison, wherein the model of computing resource usage comprises a set of adjustable equations that describes the state of the computer system.

10. A method for predictive computing resource allocation in a distributed environment, the method comprising:
modelling resource usage in a computer system, the computer system comprising a plurality of geographically distributed nodes organized into a plurality of clusters, each node providing at least one computing resource, and each cluster comprising at least two of the plurality of nodes;
predicting a future resource requirement in the computer system based on the modelled resource usage;
identifying available computing resources in the computer system capable of meeting the predicted future resource requirement;
calculating a resource cost of each computing resource in the computer system;
determining a least expensive set of resources that meets the predicted future resource requirement based on the available computing resources and the calculated resource cost of each available computing resource;
allocating available computing resources from the least expensive set of resources to meet the predicted future resource requirement based on resource cost; and
deactivating one or more highest cost nodes not part of the least expensive set of resources that meets the predicted future resource requirement.

11. The method of claim 10, further comprising:
identifying a current resource usage of the computing system;
identifying currently used computing resources in the computing system;
calculating a least expensive set of resources to meet the current usage based on the currently used computing resources, the available resources, and the calculated resource cost of each available computing resource; and
re-allocating computing resources in the computer system based on the least expensive set of resources to meet the current usage.

12. The method of claim 11, wherein re-allocating computing resources in the computer system based on the least expensive set of resources to meet the current usage comprises:
ranking nodes capable of meeting the current usage according to operating cost;
allocating computing resources of lowest cost nodes based on the node ranking; and
deactivating one or more highest-cost nodes not needed to meet the current usage.

13. The method of claim 10, further comprising:
identifying rising demand for computing resources in the computer system; and
activating a lowest cost node in response to the rising demand.

14. The method of claim 10, further comprising:
identifying lowering demand for computing resources in the computer system; and
deactivating a highest cost node in response to the lowering demand.

15. The method of claim 10, further comprising:
identifying timing requirement for the predicted future resource requirement;
calculating an activation time for an inactivate node in the least expensive set of resources based on the timing requirement, the activation time calculated to activate the inactive node prior to the timing requirement; and
activating the inactivate node at the activation time.

16. The method of claim 10, wherein calculating a resource cost of each computing resource in the computer system further comprises:
calculating a node cost for activating a node to which each computing resource belongs; and
calculating an incremental resource cost for operating each computing resource in an activated node.

17. The method of claim 10, wherein the available computing resources comprise computing resources from underutilized nodes and deactivated nodes.

18. A computer program product for predictive computing resource allocation in a distributed environment, the computer program product comprising a computer readable storage medium having program instructions embodied therewith, the program instructions readable/executable by a processor to cause the processor to:
generate, by processor, a model of computing resource usage in a distributed computer system, wherein the distributed computer system comprises a plurality of geographically distributed nodes organized into a plurality of clusters, each cluster comprising at least two of the plurality of nodes;
rank, by processor, nodes capable of meeting current computing resource usage according to operating cost;
allocate, by processor, computing resources of lowest cost nodes based on the node ranking;

deactivate, by processor, one or more highest cost nodes not needed to meet the current usage;

predict, by processor, future demand for computing resources in the distributed computer system;

calculate, by processor, an operation cost for each computing resource in the computer system, wherein each node provides at least one computing resource;

identify, by processor, a set of available computing resources in the computer system;

determine, by processor, a minimum cost set of computer resources capable of meeting the predicted future demand based on the set of available computing resources and on operating costs; and determine, by processor, whether to activate or deactivate each of the plurality of nodes based on the set of computer resources capable of meeting the predicted future demand.

19. The computer program product of claim 18, the program instructions further causing the processor to:

identify, by processor, a current trend of computing resource demand based on computing resource usage in the distributed computer system;

dynamically activate, by processor, a lowest-cost node capable of meeting increased demand in response to increasing demand; and dynamically deactivate, by processor, a highest-cost node in response to lowering demand.

20. The computer program product of claim 18, the program instruction further causing the processor to:

identify, by processor, timing requirement for the predicted future demand;

calculate, by processor, an activation time for an inactivate node in the least expensive set of resources based on the timing requirement, the activation time calculated to activate the inactive node prior to the timing requirement; and wherein determining whether to activate or deactivate each of the plurality of nodes based on the set of computer resources capable of meeting the predicted future demand comprises activating, by processor, the inactivate node at the activation time.

* * * * *